United States Patent
Yamada et al.

(10) Patent No.: US 12,072,323 B2
(45) Date of Patent: Aug. 27, 2024

(54) ANALYZER CONFIGURED TO DISPLAY LIST OF TARGET COMPONENTS

(71) Applicants: SHIMADZU CORPORATION, Kyoto (JP); FUJITSU LIMITED, Kawasaki (JP)

(72) Inventors: Yohei Yamada, Kyoto (JP); Shinji Kanazawa, Kyoto (JP); Hiroyuki Yasuda, Kyoto (JP); Akihiro Kunisawa, Kyoto (JP); Yuzi Kanazawa, Tokyo (JP); Yusuke Hida, Atsugi (JP)

(73) Assignees: SHIMADZU CORPORATION, Kyoto (JP); FUJITSU LIMITED, Kawasaki (JP)

( * ) Notice: Subject to any disclaimer, the term of this patent is extended or adjusted under 35 U.S.C. 154(b) by 448 days.

(21) Appl. No.: 17/600,892

(22) PCT Filed: May 8, 2019

(86) PCT No.: PCT/JP2019/018338
§ 371 (c)(1),
(2) Date: Oct. 1, 2021

(87) PCT Pub. No.: WO2020/225864
PCT Pub. Date: Nov. 12, 2020

(65) Prior Publication Data
US 2022/0196615 A1 Jun. 23, 2022

(51) Int. Cl.
*G01N 30/86* (2006.01)
(52) U.S. Cl.
CPC ..... *G01N 30/8634* (2013.01); *G01N 30/8693* (2013.01)
(58) Field of Classification Search
CPC ........... G01N 30/8651; G01N 30/8624; G01N 30/8631; G01N 30/8693
See application file for complete search history.

(56) References Cited

U.S. PATENT DOCUMENTS 6,002,986 A * 12/1999 Mito .................. G01N 30/8624
702/23
9,823,228 B2 * 11/2017 Yoshioka ............... G01N 30/72
(Continued)

FOREIGN PATENT DOCUMENTS

| DE | 44 08 300 A1 | 9/1994 |
| JP | 06-324029 A | 11/1994 |

(Continued)

OTHER PUBLICATIONS

Decision to Grant a Patent issued Jun. 21, 2022 from the Japanese Patent Office in Japanese Application No. 2021-518242.
Chinese Office Action dated Jun. 21, 2023 in Chinese Application No. 201980095563.4.
(Continued)

*Primary Examiner* — Lam S Nguyen
(74) *Attorney, Agent, or Firm* — Sughrue Mion, PLLC

(57) ABSTRACT

An analyzer configured to acquire a chromatogram or spectrum by performing a predetermined analysis of a sample and perform a qualitative or quantitative analysis of components contained in the sample. The analyzer includes: a peak detection unit configured, based on information regarding a plurality of target components that need to be checked whether contained in the sample or that need to be quantified, to detect a peak or peaks in the chromatogram or spectrum acquired by the predetermined analysis of the sample corresponding to one of the target components, configured to acquire peak information regarding each of the peak or peaks, and configured to obtain confidence information for each of the peak or peaks, the confidence information being an indicative value of certainty of detecting a peak; and a display processing unit configured to display on a display unit a list of at least a part of the target components.

14 Claims, 7 Drawing Sheets

| No | COMPOUND NAME | R.T. | QUANTITATIVE VALUE | CONFIDENCE FOR DETECTING PEAK▼ |
|----|---------------|------|--------------------|--------------------------------|
| 1 | Comp A | 1.0 | 10000 | 0.81 |
| 2 | Comp B | 1.5 | 5000 | 0.64 |
| 3 | Comp C | 1.8 | 1500000 | 0.90 |
| 4 | Comp D | 2.1 | 230000 | 0.67 |
| ⋮ | ⋮ | ⋮ | ⋮ | ⋮ |

(56) References Cited

U.S. PATENT DOCUMENTS

| | | | | |
|---|---|---|---|---|
| 11,302,039 | B2* | 4/2022 | Osoekawa | ............. G06N 3/045 |
| 2015/0081250 | A1 | 3/2015 | Nakayama | |
| 2019/0064130 | A1 | 2/2019 | Kanazawa et al. | |
| 2020/0110064 | A1* | 4/2020 | Sugimoto | .......... G01N 30/8651 |
| 2020/0292509 | A1* | 9/2020 | Osoekawa | ......... G01N 30/8631 |

FOREIGN PATENT DOCUMENTS

| | | | |
|---|---|---|---|
| JP | 2004-085356 | A | 3/2004 |
| JP | 2009-008582 | A | 1/2009 |
| JP | 2015-059782 | A | 3/2015 |
| WO | 2017/002156 | A1 | 1/2017 |
| WO | 2017/094170 | A1 | 6/2017 |
| WO | 2018/207228 | A1 | 11/2018 |

OTHER PUBLICATIONS

Wei Liu et al., "SSD: Single Shot Multibox Detector", [online], [searched Apr. 18, 2019], arXiv.org, Internet.
"Multisample MS Rapid Quantification Analysis Software: MS Quant Manager", [online], Jun. 14, Reifycs Inc. [Retrieved: Jul. 24, 2019], Internet: <URL:https://ja.reifycs.com/files/BrochureMsQuantManager.pdf>.
International Search Report of PCT/JP2019/018338 dated Aug. 6, 2019 [PCT/ISA/210].
Written Opinion of PCT/JP2019/018338 dated Aug. 6, 2019 [PCT/ISA/237].
Extended European Search Report dated Mar. 24, 2022 from the European Patent Office in European Patent Application No. 19928242.7.

* cited by examiner

FIG. 7
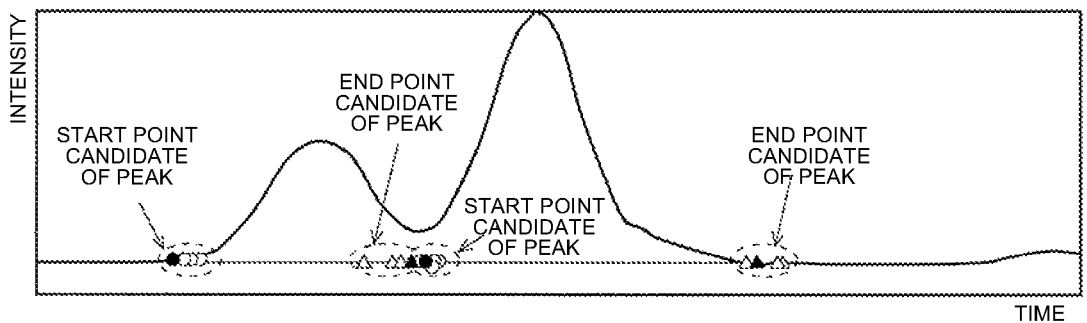
FIG. 8
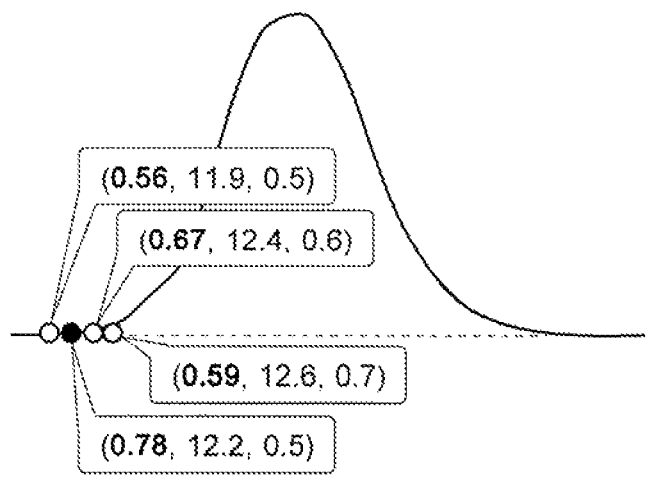
FIG. 9
| No | COMPOUND NAME | R.T. | QUANTITATIVE VALUE | CONFIDENCE FOR DETECTING PEAK▼ |
|---|---|---|---|---|
| 1 | Comp A | 1.0 | 10000 | 0.81 |
| 2 | Comp B | 1.5 | 5000 | 0.64 |
| 3 | Comp C | 1.8 | 1500000 | 0.90 |
| 4 | Comp D | 2.1 | 230000 | 0.67 |
| ⋮ | ⋮ | ⋮ | ⋮ | ⋮ |

FIG. 10

| No | COMPOUND NAME | R.T. | QUANTITATIVE VALUE | CONFIDENCE FOR DETECTING PEAK ▼ |
|---|---|---|---|---|
| 1 | Comp B | 1.5 | 5000 | 0.64 |
| 2 | Comp D | 2.1 | 230000 | 0.67 |
| 3 | Comp A | 1.0 | 10000 | 0.81 |
| 4 | Comp C | 1.8 | 1500000 | 0.90 |
| ⋮ | | | | |

FIG. 11

| No | COMPOUND NAME | R.T. | QUANTITATIVE VALUE | CONFIDENCE FOR DETECTING PEAKS |
|---|---|---|---|---|
| 1 | Comp A | 1.0 | 10000 | 0.81, 0.77, 0.68 |
| 2 | Comp B | 1.5 | 5000 | 0.64, 0.59 |
| 3 | Comp C | 1.8 | 1500000 | 0.90, 0.87, 0.82 |
| 4 | Comp D | 2.1 | 230000 | 0.67, 0.61, 0.58 |
| ⋮ | ⋮ | ⋮ | ⋮ | ⋮ |

FIG. 12

NARROWING-DOWN CONDITION THRESHOLD : 0.7

| No | COMPOUND NAME | R.T. | QUANTITATIVE VALUE | CONFIDENCE FOR DETECTING PEAK |
|---|---|---|---|---|
| 2 | Comp B | 1.5 | 5000 | 0.64 |
| 4 | Comp D | 2.1 | 230000 | 0.67 |
| ⋮ | ⋮ | ⋮ | ⋮ | ⋮ |

FIG. 13

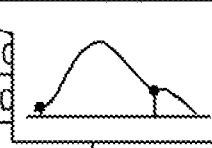

| No | COMPOUND NAME | R.T. | QUANTITATIVE VALUE | CONFIDENCE FOR DETECTING PEAKS |
|---|---|---|---|---|
| 1 | Comp A | 1.0 | 10000 | 0.81, 0.77, 0.68 |
| 2 | Comp B | 1.5 | 5000 | 0.64, 0.59 |
| 3 | Comp C | 1.8 | 1500000 | 0.90, 0.87, 0 |
| 4 | Comp D | 2.1 | 230000 | 0.67, 0.61, 0 |
| ⋮ | ⋮ | ⋮ | ⋮ | ⋮ |

ANALYZER CONFIGURED TO DISPLAY LIST OF TARGET COMPONENTS

CROSS REFERENCE TO RELATED APPLICATIONS

This application is a National Stage of International Application No. PCT/JP2019/018338, filed May 8, 2019.

TECHNICAL FIELD

The present invention relates to an analyzer that processes data of a chromatogram waveform or a spectrum waveform acquired based on analysis of a sample, so as to perform a qualitative analysis or a quantitative analysis of the sample. The analyzer according to the present invention includes, for example, a gas chromatograph (GC) including a gas chromatograph mass spectrometer, a liquid chromatograph (LC) including a liquid chromatograph mass spectrometer, a mass spectrometer, a spectrum analyzer (e.g., an infrared absorption spectrophotometer, a visible-ultraviolet spectrophotometer, or a fluorescence spectrophotometer), and an X-ray analyzer (e.g., an X-ray fluorescence analyzer or an X-ray diffraction analyzer).

BACKGROUND ART

In a gas chromatograph or a liquid chromatograph, a sample containing various components is introduced into a column; and in a process where the sample passes through the column, the various components are temporally separated and detected by a detector disposed at an outlet of the column. Based on signals generated by the detector, a chromatogram is created, where the chromatogram exhibits peaks corresponding to the various components in the sample. Each of the peaks is observed at a time (retention time) that corresponds to each of the various components. Accordingly, it is possible, based on the retention time of the peak, to identify the corresponding component, in other words, to perform a qualitative analysis. Concurrently, the peak has a height or an area that corresponds to concentration or content of each of the components. Accordingly, it is possible, based on the height or area of the peak, to obtain the concentration or content of the corresponding component, in other words, to perform a quantitative analysis.

In order to perform the qualitative analysis or the quantitative analysis, a peak needs to be accurately detected in a chromatogram waveform such that positions (time points) of a start point and an end point of the peak are determined. In a chromatogram waveform actually obtained, various noises are included, and the baseline often fluctuates. Further, peaks derived from two or more components may overlap each other. Thus, it is not easy to detect the peak accurately in the chromatogram waveform. In view of this, in order to detect a peak in a chromatogram waveform, various algorithms are conventionally proposed for practical use (See Patent Literature 1, Patent Literature 2, or others). Recently, artificial intelligence (AI), such as deep learning, has been increasingly used to detect peaks in a chromatogram waveform.

CITATION LIST

Patent Literature

Patent Literature 1: JP 2009-8582 A
Patent Literature 2: WO 2017/094170 A
Patent Literature 3: JP 2015-59782 A

Non Patent Literature

Non Patent Literature 1: Wei Liu and six others, "SSD: Single Shot Multibox Detector", [online], [searched Apr. 18, 2019], arXiv.org, Internet

SUMMARY OF INVENTION

Technical Problem

As described above, various methods are provided for detecting a peak. However, with any of the algorithms, an accurate peak detection in various forms of chromatogram is not always possible. In view of this, typically, an operator checks, on a display screen, the chromatogram waveform and the automatically detected peaks, that is, the waveform shape of the peak as well as a start point and an end point of the peak; and, when necessary, manually corrects the waveform shape and/or the start point and the end point of the peak (See Patent Literature 3 or others).

However, in a case of simultaneous analysis of multiple components, 100 or more compounds should be simultaneously measured. In such a case, multiple peaks corresponding to the multiple compounds, should be observed in a chromatogram waveform. Additionally, in some cases, a large number of samples are to be measured, which brings about a large number of chromatogram waveforms. In these cases, the operator is required to visually check each of all the peaks in each of the chromatogram waveforms, so as to identify a peak that has not been accurately detected, and manually correct the start point and/or the end point of the peak identified. A sequence of these operations necessitates a long period of time, and heavy workload to the operator. This tends to cause an operational error, such as failing to identify some of inappropriate peaks.

Such a problem is not limited to detecting a peak in a chromatogram acquired by a gas chromatograph or a liquid chromatograph, but may also arise in detecting a peak in a mass spectrum acquired by a mass spectrometer, detecting a peak in an absorption or a fluorescence spectrum acquired by a spectrum analyzer, or detecting a peak in an X-ray intensity spectrum acquired by an X-ray analyzer.

In view of these problems, an object of the present invention is to provide an analyzer configured: to reduce the workload required of the operator to determine the accuracy of the peaks, which have been automatically detected, and correct the inaccurate peaks; and to efficiently perform a highly accurate qualitative analysis and/or a highly accurate quantitative analysis.

Solution to Problem

In order to solve the problems described above, an aspect of the present invention provides an analyzer configured to acquire a chromatogram or a spectrum by performing a predetermined analysis of a sample, and configured, based on the chromatogram or the spectrum, to perform a qualitative analysis or a quantitative analysis of target components contained in the sample, the analyzer including:
a peak detection unit configured to detect a peak or peaks in the chromatogram or the spectrum acquired by the predetermined analysis of the sample corresponding to one of the target components, configured to acquire peak information regarding each of the peak or peaks, and configured to obtain confidence information for each of the peak or peaks, the confidence information being an indicative value of certainty of detecting a peak; and a display processing unit configured to display on a display unit a list of at least a part of the target components, the list describing the target components in correspondence to the confidence information for each of the peak or peaks detected by the peak detection unit, each of the peak or peaks corresponding to one of the target components included in the list, or describing the target components in correspondence to other information obtained based on the confidence information.

In the present invention, the predetermined analysis corresponds to, for example, a chromatograph analysis such as liquid chromatography or gas chromatography, mass spectrometry, an ion mobility analysis, a spectrum analysis such as absorption spectrophotometry or fluorescence spectrophotometry, an X-ray analysis, or others. The component contained in the sample is a compound, a molecule, an element, or the like.

Advantageous Effects of Invention

When a predetermined analysis corresponds to a chromatograph analysis, based on which a chromatogram is acquired, in an analyzer according to an aspect of the present invention, a peak detection unit uses, for example, information regarding predetermined retention time for each of a plurality of target components, to detect a peak for a corresponding one of the plurality of target components in the chromatogram. The peak detection unit obtains peak information based on, for example, a waveform shape of each of the peaks detected, the peak information including a start point and an end point of each of the peaks, and obtains confidence information for each of the peaks detected, the confidence information indicating certainty of the peak information. Upon receiving the confidence information for each of the peaks, the display processing unit creates a component list where all of or a part of the target components are described in correspondence to the confidence information for each of the peaks (that corresponds to a corresponding one of the target components), or in correspondence to the other information obtained based on the confidence information. Then, the display processing unit displays the component list on the display unit.

Here, the other information obtained based on the confidence information for each of the peaks includes, for example, binary information as a result of judgement of the indicative value based on a predetermined threshold value, or graphical information (e.g., an icon) corresponding to the indicative value or a range of values including the indicative value.

When the confidence information for each of the peaks is displayed as a numerical value, the higher confidence may be represented by either larger numerical value or smaller numerical value. Further, in a case where the confidence information for each of the peaks is graphically displayed, the higher confidence may be shown by any form of graphical representation. In any case, as long as it is possible for the operator, i.e., a human, to determine whether or not the information is accurate, any representation or form may be shown by the display.

For example, in the case where higher confidence is set to correspond to a larger indicative value (i.e. the confidence information for each of the peaks), in the component list which the display processing unit displays on the display unit, it is highly probable that a component exhibiting a smaller indicative value have inaccurate peak information (e.g., the start point or the end point of the peak) as compared with a component exhibiting a greater indicative value. In this case, the operator can sequentially check, in the component list displayed, the confidence information for each of the peaks or the other information obtained based on the confidence information. Here, the operator may select, for example, only the component exhibiting the indicative value of the confidence significantly smaller than the others, and check the waveform shape of the peak detected, the peak corresponding to the component at issue.

As described above, with an analyzer according to an aspect of the present invention, the operator efficiently checks the peak information having lower reliability among the peaks that have been automatically detected, and corrects the peak information when necessary. With this configuration, it is possible to reduce the workload required of the operator with regard to the qualitative analysis or the quantitative analysis in the simultaneous analysis of the multiple components, and thus to efficiently perform the analysis. Further, in the analysis of, for example, a chromatogram or spectrum where many peaks are observed, the operator can simply check a less number of peaks, resulting in less operational errors or failures.

BRIEF DESCRIPTION OF DRAWINGS

FIG. 7 is a diagram showing an example of display of a start point candidate and an end point candidate for a peak obtained in the process of automatically detecting the peak in the LC system of this embodiment.

FIG. 8 is a diagram showing an example of the start point candidate and the end point candidate for the peak obtained in the process of automatically detecting the peak in the LC system of this embodiment.

FIG. 9 is a diagram showing an example of a compound list displayed in the LC system of this embodiment, the compound list including confidence information of detecting peaks.

FIG. 10 is a diagram showing an example where the compound list in FIG. 9 is sorted in an increasing order of the confidence of detecting the peaks.

FIG. 11 is a diagram showing a first other example of the compound list displayed in the LC system of this embodiment, the compound list including confidence information of detecting peaks.

FIG. 12 is a diagram showing a second other example of the compound list displayed in the LC system of this embodiment, the compound list including confidence information of detecting peaks.

FIG. 13 is a diagram showing a third other example of the compound list displayed in the LC system of this embodiment, the compound list including confidence information of detecting peaks.

DESCRIPTION OF EMBODIMENTS

An LC system of an embodiment of an analyzer according to the present invention will be described in detail below with reference to the appended drawings.

Figure 1:
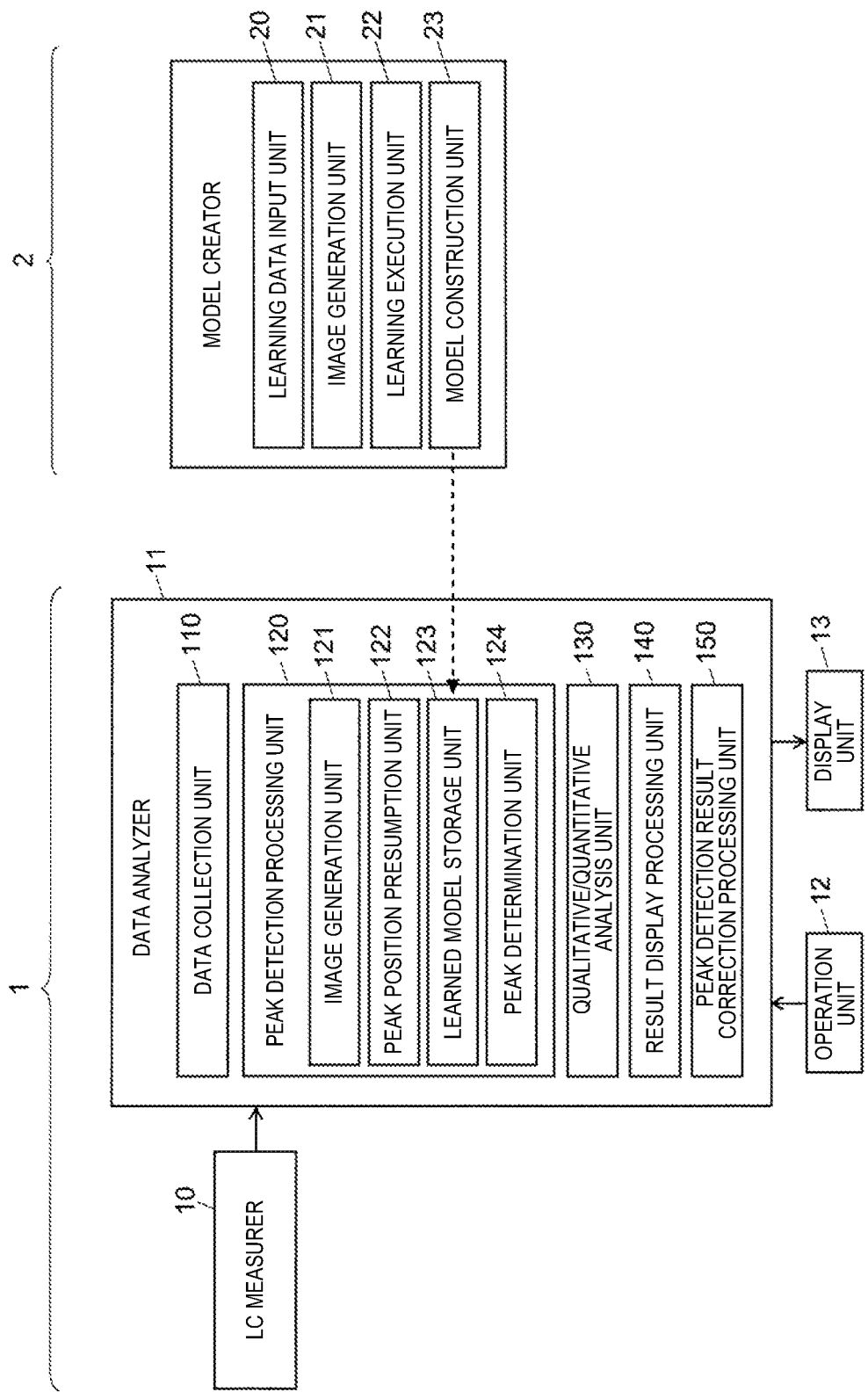
FIG. 1 is a schematic configuration diagram of an LC system and a system for creating a learned model used in the LC system, each according to an embodiment of the present invention.

FIG. 1 is a schematic configuration diagram of the LC system of this embodiment, and a system for creating a learned model used in the LC system.

An LC system 1 includes an LC measurer 10, a data analyzer 11, an operation unit 12, and a display unit 13. While not shown, the LC measurer 10 includes a liquid feeding pump, an injector, a column, a column oven, a detector, and others. The LC measurer 10 executes an LC analysis of a sample provided to acquire chromatogram data that indicates a temporal change in signal intensity acquired by the detector. The detector may be of any type or form, and may be, for example, a mass spectrometer or a photodiode array (PDA) detector.

The data analyzer 11 includes functional blocks such as a data collection unit 110, a peak detection processing unit 120, a qualitative/quantitative analysis unit 130, a result display processing unit 140, and a peak detection result correction processing unit 150. The peak detection processing unit 120 further includes functional blocks such as an image generation unit 121, a peak position presumption unit 122, a learned model storage unit 123, and a peak determination unit 124.

In the data analyzer 11, the data collection unit 110 collects the chromatogram data acquired by the LC measurer 10, and stores the chromatogram data. The peak detection processing unit 120 automatically detects a peak or peaks in a chromatogram waveform based on the chromatogram data; and outputs peak information regarding each of the peak or peaks, the peak information including positions of a start point and an end point (retention time) of each of the peak or peaks and confidence for each of the peak or peaks, the confidence being an indicative value of certainty of detecting a peak. Based on the peak information regarding each of the peak or peaks provided by the peak detection processing unit 120, the qualitative/quantitative analysis unit 130 identifies a component (compound) corresponding to each of the peak or peaks and calculates a height or area of the peak. Based on the height or area, the qualitative/quantitative analysis unit 130 calculates a quantitative value as concentration or content of the component. The result display processing unit 140 receives information regarding the quantitative value and the confidence for each of the peak or peaks, and displays the information in a predetermined format on the display unit 13. In accordance with an operation executed by an operator via the operation unit 12, the peak detection result correction processing unit 150 corrects the information regarding the peak detected by the peak detection processing unit 120.

In FIG. 1, a model creator 2, which is provided separately from the LC system 1, includes functional blocks of a learning data input unit 20, an image generation unit 21, a learning execution unit 22, and a model construction unit 23. A learned model created by the model creator 2 is to be stored in the learned model storage unit 123 in the data analyzer 11 of the LC system 1.

Normally, the data analyzer 11 is actually a personal computer having predetermined software installed, a higher-performance workstation, or a computer system including higher-performance computers connected to computers of these types via a communication line. In other words, each of the functional blocks included in the data analyzer 11 can be embodied in processing of various data stored in a computer or a computer system including a plurality of the computers, the processing performed by execution of the software(s) installed in the computer or the computer system.

Next, a process for detecting each of the peak or peaks, the process performed by the peak detection processing unit 120, will be described in detail.

Schematically speaking, the peak detection processing unit 120 converts the chromatogram waveform (a chromatogram curve) into a two-dimensional image, and based on a deep learning method as a method of machine learning to detect a category and a position of an object seen in the image, detects the positions of the start point and the end point of each of the peak or peaks.

Creation of Learned Model

Figure 2:
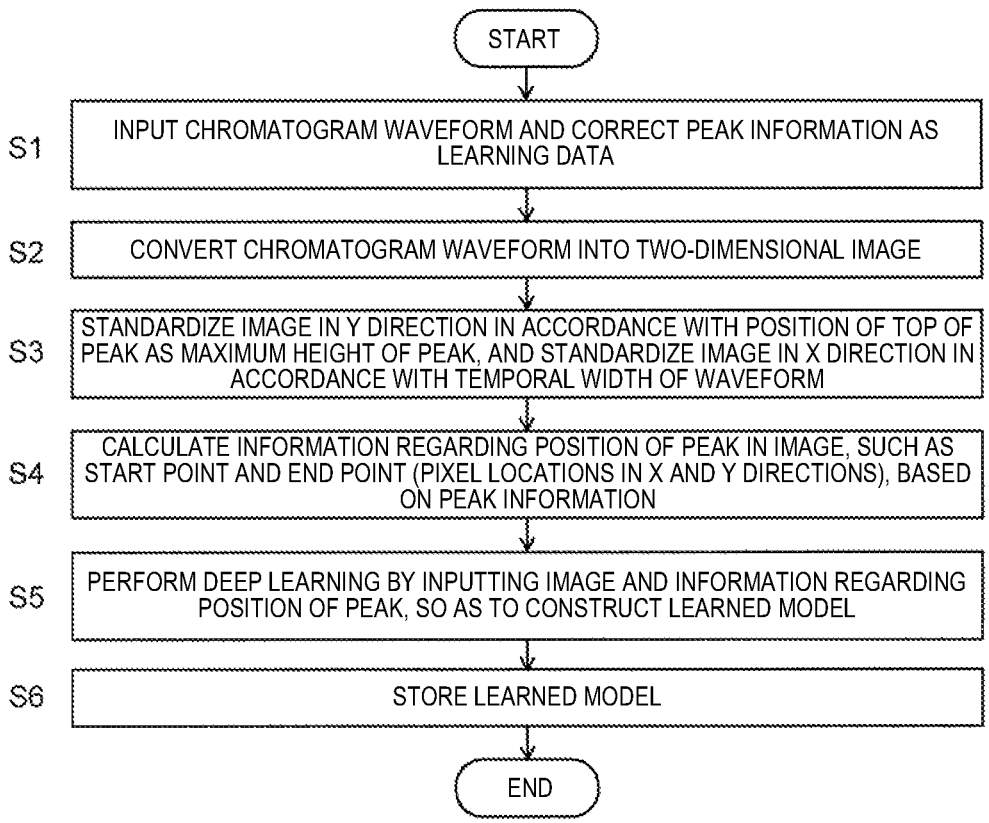
FIG. 2 is a flowchart showing a flow of a process for creating the learned model used in the LC system of this embodiment.

As is well known, in the methods of the machine learning, a learned model needs to be previously constructed based on a plurality of learning data. As described above, the learned model is constructed not in the data analyzer 11 (as a part of the LC system 1) but in the model creator 2 included in another computer system, and the result is stored in the learned model storage unit 123. The reason for the above is, constructing the learned model typically leads to processing of the large quantity of data and a large amount of calculation, necessitating a computer capable of exhibiting considerably high performance and dealing with image processing. FIG. 2 is a flowchart showing a flow of a process for creating the learned model, the process performed in the model creator 2.

In order to create the learned model, a plurality and a variety of chromatogram waveform data need to be prepared, and retention time between a start point and an end point in a peak or a plurality of peaks) in the corresponding chromatogram waveform data needs to be accurately obtained. Here, the variety of chromatogram waveform data correspond to chromatogram waveforms including elements such as inclusion of various noises, baseline fluctuations (drift), overlapping of a plurality of peaks, or distortion of a peak, each of the elements possibly appearing in the chromatogram waveforms when detecting each of the peak or peaks. The learning data input unit 20 reads, as learning data, a set of the plurality of chromatogram waveform data and accurate peak information including the start point and the end point of each of the peak or peaks (step S1).

The image generation unit 21 creates a chromatogram based on the chromatogram waveform data as a time-series signal, and converts the chromatogram waveform (chromatogram curve) indicating a change in signal intensity over time into a two-dimensional image having a pixel, the number of which is predetermined (step S2). Here, the number of the pixels is, as an example, 512×512. When being converted into the image, the chromatogram waveform is standardized in size in a Y direction such that a peak top of a peak, which is the greatest in signal intensity among the peaks in the chromatogram waveform, matches an upper side of the image of a rectangular shape. Concurrently, the chromatogram waveform is standardized in size in an X direction such that an entire range of measurement time or a part of the entire range of measurement time (e.g., a range of measurement time specified by the user) matches a length of the image of the rectangular shape in the X direction (a horizontal direction) (step S3). Note that, when the chromatogram waveform is standardized in size in the X direction and when the data point is less than 512 pixels, the chromatogram waveform data may be appropriately upsampled and converted into a high-resolution waveform in accordance with the original chromatogram waveform data.

The image generation unit 21 similarly converts all of the chromatogram waveform data read in the step S1 into images. When having been converted into the image, each of the chromatogram waveforms has been standardized, so that the intensity information and the time information regarding the original chromatogram waveform is lost. In this state, an image showing a shape of the corresponding chromatogram waveform is generated. It is naturally to be understood that, while the learning data input unit 20 is reading each of the chromatogram waveform data in the step S1, the chromatogram waveform data having been read may proceed to the steps S2 and S3 and converted into the image; and thus, the steps S2 and S3 need not wait until all of the chromatogram waveform data have been read.

The image generation unit 21 converts the peak information, which is provided as the set with the chromatogram waveform data, into information regarding the position of each of the peak or peaks in the image (in other words, information regarding a pixel location in each of the X direction and the Y direction), in accordance with the corresponding chromatogram waveform standardized in the X direction and the Y direction (in other words, in accordance with expansion and contraction of the corresponding chromatogram waveform when being converted) (step S4).

Next, the learning execution unit 22 performs the machine learning by using a plurality of images generated from the chromatogram waveforms as the learning data. Then, based on results of the machine learning, the model construction unit 23 constructs the learned model to presume the start point and the end point of each of the peak or peaks in the chromatogram waveforms. As is well known, various types of machine learning algorithms are provided, and here, deep learning as a general object detection algorithm in image recognition is used; and further, a single shot multibox detector (SSD) method, which particularly excels in the image recognition, is used (step S5).

The SSD method uses a convolutional neural network (CNN) that is most widely used in the deep learning, and currently represents an algorithm capable of the image recognition at highest speed and at highest accuracy. The SSD method is proposed by Liu Wei and others in Non Patent Literature 1 where the algorithm is described in detail, and thus, only the features in this embodiment will be described below.

In the typical SSD method, an image feature map extracted via the CNN is used to estimate a region where an object exists in a two-dimensional image, and the image feature maps are gradually convolved, so that the image feature maps in various sizes (the various numbers of pixels) are used. With this configuration, candidates for the region where the object exists, the region in various sizes, are detected. However, what needs to be detected is the positions of the start point and the end point for each of the peak or peaks in the X direction. Accordingly, the algorithm has been modified to detect the start point and the end point for each of the peak or peaks appearing within segments of various sizes in the X direction.

Figure 4:
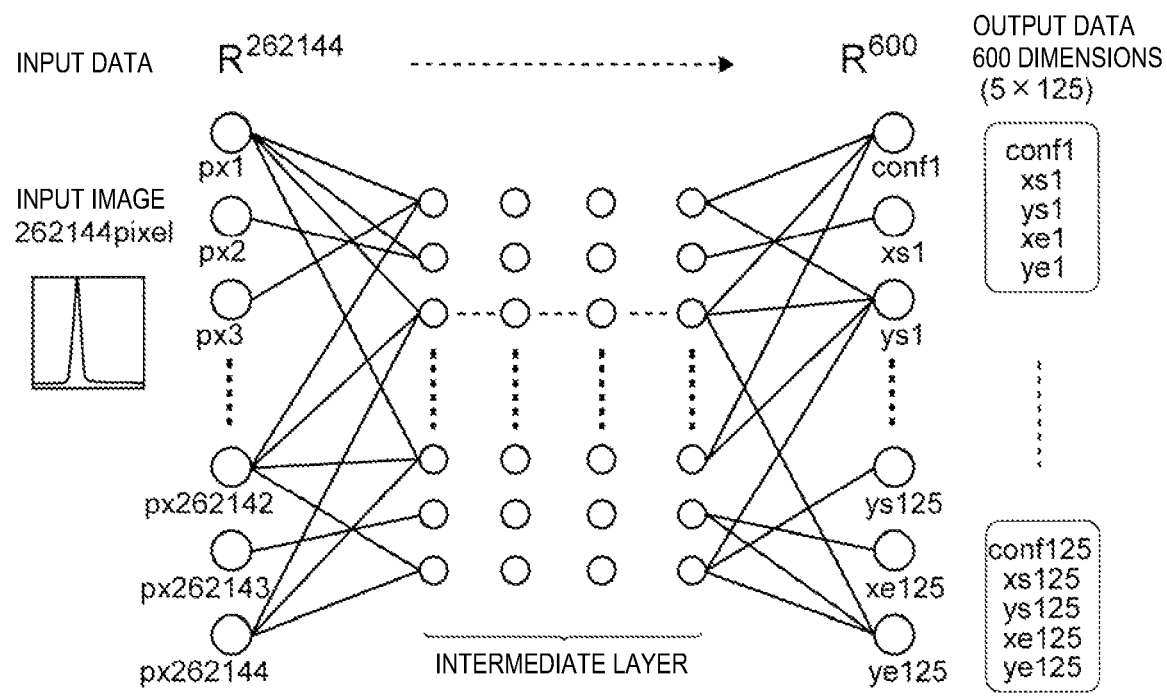
FIG. 4 is a schematic diagram showing the learned model used in the LC system of this embodiment, the learned model using a neural network.
Figure 5:
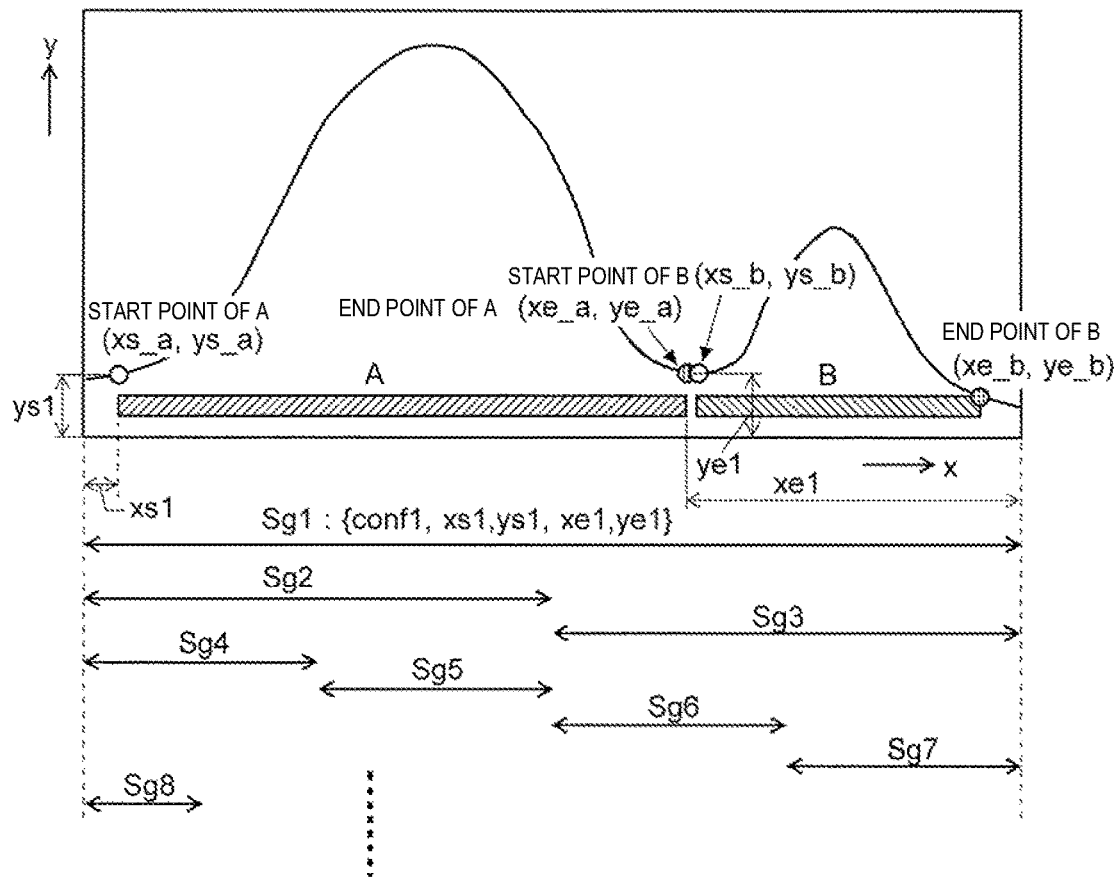
FIG. 5 is a schematic diagram for describing the process for creating the learned model used in the LC system of this embodiment.

FIG. 4 is a schematic diagram showing the learned model used in this embodiment, the learned model using the neutral network. FIG. 5 is a schematic diagram for describing the process for creating the learned model. As shown in FIG. 5, a segment Sg1, having a window of a width equal to the entire length in the X direction of the image that has been generated in the steps S2 and S3 above, is prepared. Then, the segment Sg1 is divided into two such that a segment Sg2 and a segment Sg3, each having a window of a width equal to half of the width of the window of the segment Sg1, are prepared. Similarly, the segment Sg2 is divided into two such that a segment Sg4 and a segment Sg5, each having a window of a width equal to a quarter of the width of the window of the segment Sg1, are prepared; and the segment Sg3 is divided into two such that a segment Sg6 and a segment Sg7, each having a window of the width equal to the quarter of the width of the window of the segment Sg1, are prepared. The operations above are repeated such that a total of 120 segments from the segment Sg1 to a segment Sg120 are defined. Each of the 120 segments corresponds to a unit used for extracting the image feature map by the CNN, and based on the image as the learning data, a peak range of each of the peak or peaks, which is defined by the start point and the end point of the corresponding peak, is learned in each of the units.

In the neural network used for the learned model, as shown in FIG. 4, an input layer includes 262,144 nodes, and a pixel value, which each of the pixels has in the image of 512×512 pixels, is inputted to each of the 262,144 nodes. In FIG. 4, a pxn represents an nth pixel in a single image. Note that, in a case where the image has a color or a plurality of colors, in each of the pixels, for example, a pixel value in each of three primary colors, is inputted, so that the number of the nodes in the input layer is increased to, for example, three times.

In response to the inputs based on the plurality of images as described above, in the learning execution unit 22, the network of a layer structure including a plurality of intermediate layers is learned through the deep learning, and information for numerical values is outputted from each of 600 nodes provided in an output layer as a last part of the layer structure. The information outputted from the 600 nodes is five-dimensional information calculated for each of the 120 segments, Sg1 to Sg120, as follows: confidence for a peak detected (confidence) in the nth segment, i.e., confn; an offset amount in the X direction from a left end of the window of the nth segment to a start point of the peak, i.e., xsn; an offset amount in the Y direction from a lower end of an input image to the start point of the peak, i.e., ysn; an offset amount in the X direction from a right end of the window of the nth segment to an end point of the peak, i.e., xen; and an offset amount in the Y direction from the lower end of the input image to the end point of the peak, i.e., yen. In FIG. 5, the five-dimensional information for the first segment Sg1 is shown as {conf1, xs1, ys1, xe1, ye1}. Here, the confidence for detecting the peak is defined by a length of overlap between the peak range and the window, and the value is within a range from 0 to 1.

In an example of FIG. 5, the chromatogram waveform has two peaks. The peak of the first half has a start point at pixel location (xs_a, ys_a) and an end point at pixel location (xe_a, ye_a), and has a peak range A. On the other hand, the peak of the second half has a start point at pixel location (xs_b, ys_b) and an end point at pixel location (xe_b, ye_b), and has a peak range B. In this case, xs1, ys1, xe1, and ye1 in the segment Sg1 are to be shown in FIG. 6. Concurrently, conf corresponds to a value calculated in accordance with an overlap between the width of the window of the segment Sg1 and the peak range A. As described above, in the learning data, pixel locations for the start point and the end point of each of the peak or peaks and/or the peak range of the corresponding peak are/is known. Accordingly, the learned model is constructed by performing the learning based on the plurality of learning data such that the pixel locations and/or the peak range are/is as correct as possible and concurrently, by calculating a network weight in each of intermediate layers.

The model construction unit 23 temporarily stores the learned model obtained through the deep learning based on the plurality of learning data (step S6). In the LC system 1, the learned model, which has been created in the model creator 2 as described above, is transmitted via, for example, the communication line and stored in the learned model storage unit 123.

Process for Detecting Peak in Target Sample

Figure 3:
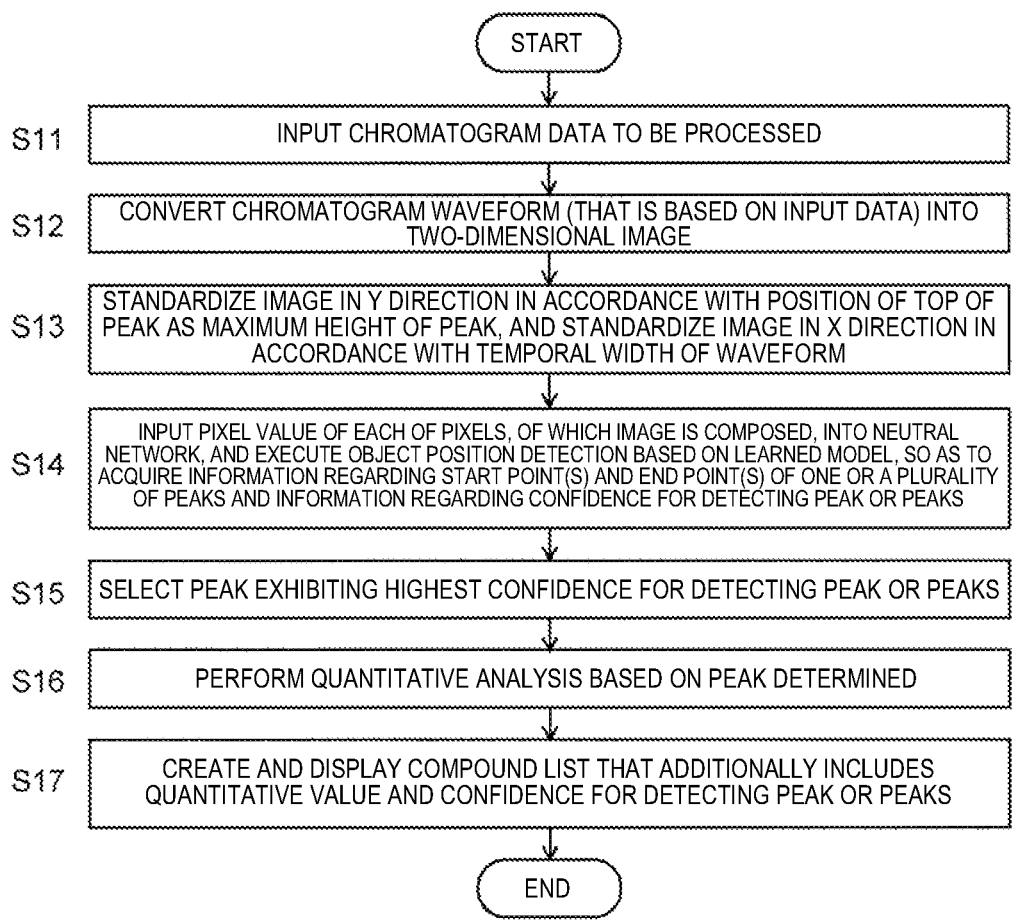
FIG. 3 is a flowchart showing a flow of a process for detecting a peak in the LC system of this embodiment.

Next, a process for detecting each of the peak or peaks in the chromatogram waveform acquired for a target sample, the process performed in the data analyzer 11 of the LC system 1, will be described. FIG. 3 is a flowchart showing a flow of the process for detecting each of the peak or peaks in the peak detection processing unit 120.

First, the image generation unit 121 reads, from the data collection unit 110, the chromatogram waveform data to be processed (step S11). Then, the image generation unit 21 executes steps S12 and S13, which are similar to the steps S2 and S3 executed by the image generation unit 21 of the model creator 2, i.e., the process for converting the chromatogram waveform data into the image, so as to generate an image including the chromatogram curve, the image of 512×512 pixels.

When it is predetermined which component needs to be checked whether contained in the target sample or not, or which component, when contained in the target sample, needs to be checked in the amount, standard retention time for each of these target components is previously known. Thus, in each of the target components, the chromatogram waveform may be cut out in a range of predetermined time in a vicinity of the standard retention time, and based on the chromatogram waveform that has been cut out, the image including the chromatogram curve may be generated. With this configuration, a peak corresponding to each of the target components can be detected on the chromatogram. On the other hand, when an unknown component whose standard retention time needs to be detected, or when an unknown target component and a known target need to be detected together, the range of time is not to be limited, and each of the peak or peaks is to be detected in the entire range of time for measuring the chromatogram waveform.

Note that, when the detector of the LC measurer 10 is a mass spectrometer, typically, a known component whose mass-to-charge ratio is previously known is detected by selected ion monitoring (SIM) measurement or multiple reaction monitoring (MRM) measurement, and the unknown component is detected by scan measurement.

The peak position presumption unit 122 applies the learned model stored in the learned model storage unit 123 to the pixel value of each of the pixels in the image generated, so as to acquire the five-dimensional information for each of the 120 segments. In other words, the peak position presumption unit 122 acquires the information regarding the pixel locations estimated as the start point and the end point of each of the peak or peaks, together with the confidence for detecting the corresponding peak (step S14).

Figure 6:
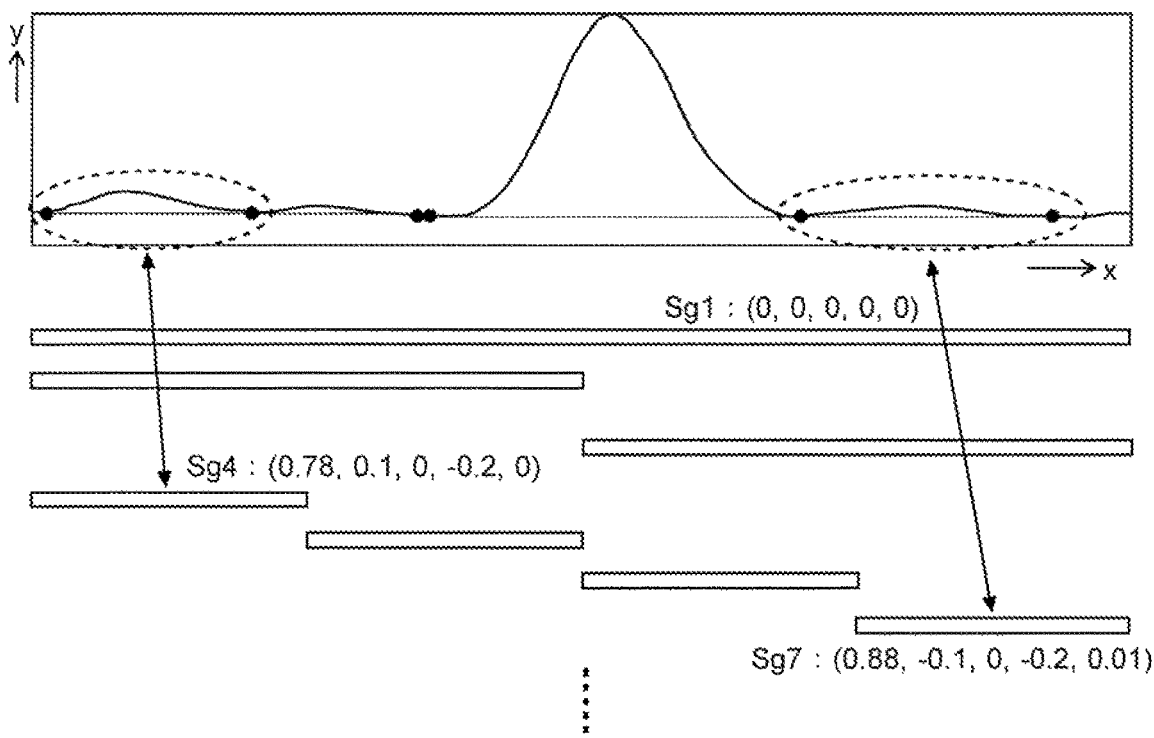
FIG. 6 is a schematic diagram for describing the process for detecting the peak based on the learned model in the LC system of this embodiment.

FIG. 6 shows an example of a result of detecting a peak. Here, {confn, xsn, ysn, xen, and yen} (where n represents 1 to 120) are acquired for each of the segments. Thus, in many cases, for a single peak, {confn, xsn, ysn, xen, and yen}, where the confidence for detecting the peak is not 0 are obtained in the plurality of segments. Note that, typically, when the confidence confn for detecting a peak is lower, the peak is less reliable. Accordingly, in this example, when the confidence confn calculated is equal to or less than a predetermined value (0.5 in this case), the five-dimensional information for the peak may be considered as not useful and is thus determined as {0, 0, 0, 0, 0}. Alternatively, all these results may be used without going through such a selection (sifting) based on the confidence.

As described above, typically, each of the peak or peaks is provided with a plurality of positions presumed as the start point and the end point, together with the confidence for detecting the corresponding peak. In other words, each of the components are provided with a plurality of peak candidates. In this state, among the plurality of positions as the start points and the end points of the peaks for each of the components, the peak determination unit 124 presumes that a peak exhibiting the highest confidence is correct, selects information regarding the start point and the end point of the peak, and outputs the information as a peak detection result (step S15).

Alternatively, instead of selecting the peak information that is presumed correct simply based on a size of the confidence for detecting the peak, the peak determination unit 124 may follow the process as will be described below.

When a peak has a plurality of start point candidates and end point candidates, for each of the plurality of start candidates and end candidates, a change of confidence for detecting the peak in timeline is regarded as a confidence distribution and converted into a graph. The graph may be a line graph, a heat map, or the like. For example, when a confidence distribution curve is obtained by appropriate fittings for a plurality of points, the confidence distribution curve does not always exhibit a maximum value at a point where the confidence for detecting the peak is the highest. In some cases, the confidence distribution curve exhibits the maximum value in a vicinity of the point where the confidence for detecting the peak is the highest. In this case, it is considered reasonable to determine the position (time point), where the confidence distribution curve exhibits the maximum value, as the peak start point or end point. Thus, the position, where the confidence distribution curve exhibits the maximum value, may be determined as the peak start point or the end point. Concurrently, the maximum value in this state may be used as the confidence for detecting the peak.

On receiving the peak detection result above, the qualitative/quantitative analysis unit 130 obtains, for each of the peak or peaks corresponding to one of the components, time at which the signal intensity is maximum (in other words, time corresponding to the top of the corresponding peak) or time corresponding to the center of gravity of the peak within a time range between the start point of the peak and the end point of the corresponding peak, and determines the time as retention time (detected RT) representing each of the peak or peaks. Concurrently, for each of the peak or peaks, the qualitative/quantitative analysis unit 130 calculates area (or the height) of the corresponding peak, and further, applies the calculated area of the corresponding peak to a previously acquired calibration curve so as to calculate the quantitative value as the concentration or content of one of the target components (step S16). The detected RT obtained for each of the peak or peaks corresponding to one of the components may be displayed in a compound list in FIGS. 9 to 13, as will be described later.

Display of Compound List

The result display processing unit 140 creates a compound list based on each of the peak or peaks corresponding to one of the components as well as the quantitative value calculated for the corresponding component, and displays the compound list on a screen of the display unit 13 (step S17).

FIG. 9 shows an example of the compound list displayed in this state. In FIG. 9, "Compound Name" corresponds to the name of each of the compounds, and "R.T." corresponds to the standard retention time or measured retention time of the corresponding component.

When checking whether or not a known component is contained in a target sample, or when checking content of a known component, the compound list is used as a list of the known components. In this case, in accordance with the compounds displayed in the compound list, each of the peak or peaks is detected in the chromatogram acquired by measuring the target sample. On the other hand, when the qualitative analysis or the quantitative analysis is performed for the unknown components (or when all the components are unknown), as described above, the peaks are detected in the entire range of time for measuring the chromatogram waveform. Then, when the unknown component is identified with one of the peaks detected, the compound name is stated in the compound list; and when the unknown component is not identified, "Unknown" is stated in the compound list. When the component is "unknown", the compound list may display "Unknown" in a section of "Compound Name", or alternatively, may leave the section blank or display "*" in the section. With regard to a section of "R.T.", the compound list may leave the section blank or display "*" in the section, or alternatively, may display the detected RT obtained by the qualitative/quantitative analysis unit 130.

In the compound list shown in FIG. 9, a column of "Quantitative Value" displays the quantitative values calculated by the qualitative/quantitative analysis unit 130. Even when a waveform of a peak remains the same, when the position(s) of the start point and/or the end point obtained by the peak detection processing unit 120 change(s), the area of the peak is to change, naturally causing a change in the quantitative value. Accordingly, when the position(s) of the start point and/or the end point of the peak are/is not appropriate, the quantitative value results in inaccuracy. In order to acquire an accurate quantitative value, it is required to appropriately correct the start point and/or the end point of the peak acquired by the peak detection processing unit 120. With a conventional LC system, in order to grasp which compound corresponds to the peak whose start point and/or end point are/is inappropriate, the operator needs to check the waveform of each single one of the peaks in the chromatogram on the screen of the display unit. Thus, when the number of compounds is greater, the operation is more complicated, necessitating more time.

On the other hand, with the LC system of this embodiment, in each of the compounds in the compound list, the confidence confn for detecting the peak, which is calculated in the process of detecting the peak, is displayed in a column of "Confidence for Detecting Peak". In the example of FIG. 9, a compound named "Comp C" has a high value of 0.90 as confidence for detecting the peak, while a compound name "Comp B" has a relatively low value of 0.64 as confidence for detecting the peak. Here, when the confidence for detecting the peak is represented by the smaller numerical value, the quantitative value is presumed to be less reliable. Accordingly, by checking the compound list displayed, the operator determines that the quantitative value is less reliable for the component whose "Confidence for Detecting Peak" is shown in a significantly smaller numerical value than the others.

In FIG. 9, the compound list displays the compounds in a sequential order of the retention time but, by clicking on an operation icon in a header of the column of "Confidence for Detecting Peak", it is possible to sort the compounds in a descending order or an ascending order of the confidence for detecting the peak. FIG. 10 is a diagram showing a state where the compound list has been sorted in an increasing order of the confidence for detecting the peak. By sorting as described above, the less reliable compound is easily extracted.

As described above, based on the numerical values of "Confidence for Detecting Peak" in the compound list, the operator selects a compound that is less reliable in quantitative value than the others. Then, the operator checks the waveform of the peak detected in the chromatogram for the compound, and corrects the peak information when necessary. Specifically, in response to a click operation via the operation unit 12 on the section of "Compound Name" or "Quantitative Value" in the compound list, the peak detection result correction processing unit 150 displays, on another window, the waveform of the peak detected in the chromatogram for the compound. FIG. 8 shows an example of displaying the waveform of the peak corresponding to one of the compounds.

In the example here, in each of the peak or peaks corresponding to one of the compounds, the position of the start point of the corresponding peak is shown with a circle and the position of end point of the corresponding peak is shown with a triangle, the positions presumed by the peak position presumption unit 122. Concurrently, the start point and the end point of the peak exhibiting the highest confidence selected by the peak determination unit 124 are painted in black; and the start points and the end points of the other peaks are shown in white. Concurrently, in each of balloon displays, the first numerical value in a bracket ( ) corresponds to the confidence for detecting the peak (within a range of 0 to 1), and the subsequent numerical values correspond to the time and intensity at the start point of the peak. Here, the numerical value of the confidence for detecting the peak, which is most important for comparisons, is shown in bold so as to be more conspicuous than the other numerical values.

The operator visually checks, on the screen of the display unit 13, the waveform as well as the positions of the start point and the end point in each of the peak or peaks. Then, the operator executes the operation via the operation unit 12 to appropriately modify the start point and/or the end point of each of the peak or peaks, and commands a reanalysis. In response to the command, the peak detection result correction processing unit 150 recalculates the area for the corresponding peak based on the positions of the start point and the end point, one or both of which has/have been modified, and further calculates the quantitative value.

With this configuration, in the LC system of this embodiment, the operator does not need to check the waveform of each single one of the peaks in the chromatogram on the display screen. Instead, the operator checks only the waveform of the peak corresponding to the compound whose quantitative value is presumed to be less reliable, and corrects the start point and/or the end point when necessary.

Note that, the compound list may additionally include other information for each of the compounds. For example, when the detector of the LC measurer 10 is a mass spectrometer, a corresponding mass-to-charge ratio (m/z) may be additionally displayed, and when the detector is a PDA detector, a corresponding wavelength may be additionally displayed. As the retention time, both of the standard retention time and the measured retention time may be displayed.

Modification of Display of Compound List

The compound list displayed on the display unit 13 in the step S17 as described above may be modified to various forms as will be described below.

For example, in a compound list such as the one shown in FIG. 9, the font, the color, the lightness, the size, or the thickness of each of the characters may be changed in accordance with a numerical value for the confidence detecting the peak or in accordance with a range of the numerical value, so that the compound showing lower/higher confidence for detecting the peak is visibly more identifiable. With regard to the compound whose numerical value of the confidence for detecting the peak is smaller than a predetermined threshold value, text information (e.g., "correction required" or "check required") may be displayed in a form of the balloon display to prompt to correct the peak. Conversely, in a case of the compound whose numerical value of the confidence for detecting the peak is equal to or greater than the predetermined threshold value, text information (e.g., "appropriate" or "check not required") may be displayed in the form of the balloon display to state that the peak is appropriate.

Still alternatively, the compound list displayed here may not describe all of the target compounds, which are to be checked whether or not contained in the sample or are to be quantified. Instead, the compound list may be narrowed down to the compound whose numerical value of the confidence for detecting the peak is smaller than the predetermined threshold value, i.e., the compound whose peak needs to be corrected or checked. FIG. 12 shows an example of a compound list having such a narrowing-down function.

In this case, when the threshold value is not specified as the narrowing-down condition, all of the target compounds are to be listed as in FIG. 9. Then, when the operator inputs the numerical value of the threshold value, the compound list excludes the compounds whose confidence for detecting the peak is equal to or greater than the threshold value, and displays only the remaining compounds, in other words, the compounds whose confidence for detecting the peak is smaller than the threshold value. With this configuration, the operator may check the waveform of the peak corresponding to only the compounds shown in the list.

In the examples of FIGS. 9 and 12, it is possible for the operator to grasp the compound whose confidence for detecting the peak is lower, but it is unknown what causes the confidence to be lower. In view of this, the balloon display or the like may be used to display an item that is presumed as a factor to cause the confidence to be lower. Specifically, factor candidates may be displayed, such as, "the positions of the start point and the end point of the peak corresponding to the compound vary significantly", "the peak possibly overlaps an adjoining peak", or "the baseline is tilted". It is possible to presume these factors in the process of detecting the peaks as described above.

The LC system in the foregoing embodiment assumes that the peaks are detected in the single chromatogram waveform, so that each of the peak or peaks corresponds to one of the components. However, in a case where the detector of the LC measurer 10 is a PDA detector or a mass spectrometer (particularly, a tandem mass spectrometer such as a triple quadrupole mass spectrometer or a quadrupole-time-of-flight mass spectrometer), a plurality of chromatograms at different wavelengths or at different mass-to-charge ratios (MRM transitions) are typically acquired for one of the compounds. Thus, in each of the plurality of chromatograms corresponding to one of the compounds, peak information including a start point and an end point of a peak and confidence for detecting the peak are acquired.

For example, when the detector of the LC measurer 10 is a tandem mass spectrometer, an extracted ion chromatogram (conventionally referred to as a mass chromatogram) is acquired for an ion in predetermined quantity and for one or more ions to be checked, so that at least two or more pieces of peak information are obtained for one of the compounds. In that case, as shown in FIG. 11, all the confidences for detecting the plurality of peaks acquired from different chromatograms may be displayed. As shown in FIG. 11, of course, at the beginning, instead of displaying all the confidences for detecting the plurality of peaks, only the confidence for detecting the peaks used for calculating the quantitative value may be displayed; and by, for example, a click operation or a mouse-over to the display column, the confidence for detecting the rest of the peaks may be displayed.

When the two or more pieces of peak information are obtained for one of the compounds, as the numerical value of the confidence for detecting the peak in the compound list, a representative value obtained based on the confidence for detecting the plurality of peaks, for example, a statistical value (e.g., a maximum value, a minimum value, an average value or a central value), may be used. Further, whenever the operator clicks on the column of "Confidence for Detecting Peak" or an icon provided at a side of the column in the compound list, the numerical values may be changed in a sequential order to be displayed.

Here, "Confidence for Detecting Peak" is displayed in numerical values, but may be displayed in appropriate icons corresponding to the numerical values or a range of the numerical values. Alternatively, "Confidence for Detecting Peak" may be further simplified to be displayed in a so-called binary value form as follows: "◦" or "1" is displayed when the confidence for detecting the peak is equal to or greater than the threshold value, and "×" or "0" is displayed when the confidence is smaller than the threshold value.

Still alternatively, as shown in FIG. 13, in "Confidence for Detecting Peak", together with the numerical value, a schematic waveform corresponding to the confidence for detecting each of the peak or peaks may be displayed in the balloon display, a pop-up screen, or others. With this configuration, it is possible for the operator to check the schematic waveform more easily.

Other Modifications

The LC system of the foregoing embodiment may be applied to various modifications, in addition to the representation of displaying the compound list.

Specifically, in the foregoing embodiment, the deep learning is used as a method for detecting the peaks. Alternatively, other methods of machine learning may be used, or still alternatively, a method other than machine learning may be used. For example, as the method other than machine learning, a symmetry factor based on evaluation of the left-to-right symmetry of the peak may be provided as the confidence information for the peak. What is important is to acquire, in the process of detecting the peak, the information indicating reliability of detecting the peak.

In the foregoing embodiment, each of the peak or peaks is detected in the chromatogram acquired by the chromatograph analysis of the sample, but the present invention is not limited thereto. The present invention may be applied to various analyzers in addition to a gas chromatograph or a liquid chromatograph.

For example, it is to be understood that the present invention may be applied to a case as follows: each of the peak or peaks is detected in various spectrum waveforms such as a mass spectrum acquired by a mass spectrometer, a mass spectrum acquired by a mass spectrometer, an optical spectrum acquired by various spectrum analyzers (e.g., an absorption spectrophotometer or a fluorescence spectrophotometer), an ion mobility spectrum acquired by an ion mobility analyzer, or an X-ray spectrum acquired by an X-ray analyzer; and based on each of the peak or peaks, the compound, the molecule, or the element may be identified or quantified.

The present invention is not limited to the foregoing embodiment or the various modifications, and any change, modification, addition, or correction appropriately made within the spirit of the present invention will naturally fall within the scope of claims of the present invention.

Various Aspects

An embodiment of the present invention has been described above with reference to the appended drawings. Finally, various aspects of the present invention will be described.

A first aspect of the present invention provides an analyzer configured to acquire a chromatogram or a spectrum by performing a predetermined analysis of a sample, and configured, based on the chromatogram or the spectrum, to perform a qualitative analysis or a quantitative analysis of target components contained in the sample,
the analyzer including:
a peak detection unit configured to detect a peak or peaks in the chromatogram or the spectrum acquired by the predetermined analysis of the sample corresponding to one of the target components, configured to acquire peak information regarding each of the peak or peaks, and configured to obtain confidence information for each of the peak or peaks, the confidence information being an indicative value of certainty of detecting a peak; and
a display processing unit configured to display on a display unit a list of at least a part of the target components, the list describing the target components in correspondence to the confidence information for each of the peak or peaks detected by the peak detection unit, each of the peak or peaks corresponding to one of the target components included in the list, or describing the target components in correspondence to other information obtained based on the confidence information.

With the analyzer according to the first aspect of the present invention, the operator efficiently checks the peak information having lower reliability among the peaks that have been automatically detected by the peak detection unit, and corrects the peak information when necessary. With this configuration, it is possible to reduce the workload required of the operator with regard to the qualitative analysis or the quantitative analysis in the simultaneous analysis of the multiple components, and thus to efficiently perform the analysis. In the analysis of, for example, a chromatogram or spectrum where many peaks are observed, the operator can simply check a less number of peaks, resulting in less operational errors or failures.

As a second aspect of the present invention, with the analyzer according to the first aspect, the peak detection unit uses prior information regarding the target components to detect each of the peak or peaks. When the predetermined analysis corresponds to a chromatograph analysis, the prior information of the target components may include standard retention time.

With the analyzer according to the second aspect of the present invention, a range (e.g., time range) for detecting each of the peak or peaks may be restricted, so that accuracy of detecting a peak is improved.

As a third aspect of the present invention, the analyzer according to the first aspect or the second aspect further includes a quantitative analysis unit configured, based on the peak information regarding each of the peak or peaks acquired by the peak detection unit, to obtain a quantitative value of the corresponding one of the target components to which each of the peak or peaks corresponds; and
the display processing unit includes the quantitative value acquired by the quantitative analysis unit into the list.

With the analyzer according to the third aspect of the present invention, it is possible for the operator to check the confidence information for each of the peak or peaks together with the quantitative value for the corresponding one of the target components.

As a fourth aspect of the present invention, with the analyzer according to any one of the first to third aspects, the display processing unit compares the confidence information for each of the peak or peaks with a predetermined threshold value, and displays the confidence information in a manner that is visibly identifiable whether the confidence is greater or smaller than the threshold value.

With the analyzer according to the fourth aspect of the present invention, the operator can determine at a glance whether the peak information has higher or lower reliability and easily select and check the waveform shape of, for example, only the peak having the lower reliability.

As a fifth aspect of the present invention, with the analyzer according to the fourth aspect, the manner that is visibly identifiable corresponds to a display of a list that has been narrowed down to peaks whose confidence is lower than the threshold value.

With the analyzer according to the fifth aspect of the present invention, data to be rechecked is efficiently extracted, which further improves work efficiency of the operator.

As a sixth aspect of the present invention, with the analyzer according to any one of the first to fifth aspects, the display processing unit sorts the list with regard to the confidence.

With the analyzer according to the sixth aspect of the present invention, similarly to the fifth aspect, the data to be rechecked is efficiently extracted, which further improves the work efficiency of the operator.

As a seventh aspect of the present invention, with the analyzer according to any one of the first to sixth aspects, in the predetermined analysis, a plurality of chromatograms are acquired for one of the target components,
the peak detection unit detects a peak or peaks in each of the plurality of chromatograms that have been acquired for the one of the target components, and
the display processing unit displays a plurality of pieces of the confidence information for each of the peak or peaks detected in each of the plurality of chromatograms that have been acquired for the one of the target components.

As an eighth aspect of the present invention, with the analyzer according to any one of the first to seventh aspects, in the predetermined analysis, a plurality of chromatograms are acquired for one of the target components, the peak detection unit detects a peak or peaks in each of the plurality of chromatograms that have been acquired for the one of the target components, and the display processing unit displays a representative value obtained based on a plurality of pieces of the confidence information for each of the peak or peaks detected in each of the plurality of chromatograms that have been acquired for the one of the target components.

With the analyzer according to the seventh and the eighth aspects, the predetermined analysis corresponds to, typically, a chromatograph analysis using a photodiode array detector capable of detecting multiple wavelengths simultaneously as a detector, or a chromatograph analysis using a tandem mass spectrometer as a detector. With an analyzer of these types, the plurality of chromatograms are acquired for one of the components (compounds), and it is thus possible to select, among the peaks, the one exhibiting the highest confidence, in other words, the peak having the highest reliability, for the quantitative analysis of the corresponding component.

As a ninth aspect of the present invention, with the analyzer according to any one of the first to eighth aspects, the peak detection unit uses a learned model that is previously constructed by machine learning based on a plurality of chromatograms or spectrums, where a start point and an end point of the peaks are known, and presumes the peak information including at least one of a position of a start point and a position of an end point in one of or a plurality of the peaks appearing in the chromatogram or the spectrum related to the sample, and the confidence information corresponds to an indicative value of certainty of presuming the peak information.

With the analyzer according to the ninth aspect of the present invention, it is possible to efficiently check reliability of the a start point and the an end point of a peak or peaks, the start point and the end point presumed based on the learned model.

REFERENCE SIGNS LIST

1 . . . LC System
10 . . . LC Measurer
11 . . . Data Analyzer
110 . . . Data Collection Unit
120 . . . Peak Detection Processing Unit
121 . . . Image Generation Unit
122 . . . Peak Position Presumption Unit
123 . . . Learned Model Storage Unit
124 . . . peak determination unit
130 . . . Qualitative/Quantitative Analysis Unit
140 . . . Result Display Processing Unit
150 . . . Peak Detection Result Correction Processing Unit
12 . . . Operation Unit
13 . . . Display Unit
2 . . . Model Creator
20 . . . Learning Data Input Unit
21 . . . Image Generation Unit
22 . . . Learning Execution Unit
23 . . . Model Construction Unit

The invention claimed is:

1. An analyzer configured to acquire a chromatogram or a spectrum by performing a predetermined analysis of a sample, and configured, based on the chromatogram or the spectrum, to perform a qualitative analysis or a quantitative analysis of target components contained in the sample, the analyzer comprising:

a peak detection unit configured to detect a peak or peaks in the chromatogram or the spectrum acquired by the predetermined analysis of the sample corresponding to one of the target components, configured to acquire peak information regarding each of the peak or peaks, and configured to obtain confidence information for each of the peak or peaks, the confidence information being an indicative value of certainty of detecting a peak; and a display processing unit configured to display on a display unit a list of at least a part of the target components, the list describing the target components in correspondence to the confidence information for each of the peak or peaks detected by the peak detection unit, each of the peak or peaks corresponding to one of the target components included in the list, or describing the target components in correspondence to other information obtained based on the confidence information, wherein the peak detection unit uses a learned model that is previously constructed by machine learning based on a plurality of chromatograms or spectrums, where a start point and an end point of the peaks are known, and presumes the peak information including at least one of a position of a start point and a position of an end point in one of or a plurality of the peaks appearing in the chromatogram or the spectrum related to the sample, and the confidence information corresponds to an indicative value of certainty of presuming the peak information.

2. The analyzer according to claim 1, wherein
the peak detection unit uses prior information regarding the target components to detect each of the peak or peaks.

3. The analyzer according to claim 1, further comprising a quantitative analysis unit configured, based on the peak information regarding each of the peak or peaks acquired by the peak detection unit, to obtain a quantitative value of the corresponding one of the target components to which each of the peak or peaks corresponds, wherein
the display processing unit includes the quantitative value acquired by the quantitative analysis unit into the list.

4. The analyzer according to claim 1, wherein
the display processing unit compares the confidence information for each of the peak or peaks with a predetermined threshold value, and displays the confidence information in a manner that is visibly identifiable whether the confidence is greater or smaller than the threshold value.

5. The analyzer according to claim 4, wherein
the manner that is visibly identifiable corresponds to a display of a list that has been narrowed down to peaks whose confidence is lower than the threshold value.

6. The analyzer according to claim 1, wherein
the display processing unit sorts the list with regard to the confidence.

7. The analyzer according to claim 1, wherein
in the predetermined analysis, a plurality of chromatograms are acquired for one of the target components, the peak detection unit detects a peak or peaks in each of the plurality of chromatograms that have been acquired for the one of the target components, and the display processing unit displays a plurality of pieces of the confidence information for each of the peak or peaks detected in each of the plurality of chromatograms that have been acquired for the one of the target components.

8. An analyzer configured to acquire a chromatogram or a spectrum by performing a predetermined analysis of a sample, and configured, based on the chromatogram or the spectrum, to perform a qualitative analysis or a quantitative analysis of target components contained in the sample, the analyzer comprising:

a peak detection unit configured to detect a peak or peaks in the chromatogram or the spectrum acquired by the predetermined analysis of the sample corresponding to one of the target components, configured to acquire peak information regarding each of the peak or peaks, and configured to obtain confidence information for each of the peak or peaks, the confidence information being an indicative value of certainty of a start point and/or an end point of each of the peak or peaks; and a display processing unit configured to display on a display unit a list of at least a part of the target components, the list describing the target components in correspondence to the confidence information for each of the peak or peaks detected by the peak detection unit, each of the peak or peaks corresponding to one of the target components included in the list, or describing the target components in correspondence to other information obtained based on the confidence information.

9. The analyzer according to claim 8, wherein the peak detection unit uses prior information regarding the target components to detect each of the peak or peaks.

10. The analyzer according to claim 8, further comprising a quantitative analysis unit configured, based on the peak information regarding each of the peak or peaks acquired by the peak detection unit, to obtain a quantitative value of the corresponding one of the target components to which each of the peak or peaks corresponds, wherein the display processing unit includes the quantitative value acquired by the quantitative analysis unit into the list.

11. The analyzer according to claim 8, wherein the display processing unit compares the confidence information for each of the peak or peaks with a predetermined threshold value, and displays the confidence information in a manner that is visibly identifiable whether the confidence is greater or smaller than the threshold value.

12. The analyzer according to claim 11, wherein the manner that is visibly identifiable corresponds to a display of a list that has been narrowed down to peaks whose confidence is lower than the threshold value.

13. The analyzer according to claim 8, wherein the display processing unit sorts the list with regard to the confidence.

14. The analyzer according to claim 8, wherein in the predetermined analysis, a plurality of chromatograms are acquired for one of the target components, the peak detection unit detects a peak or peaks in each of the plurality of chromatograms that have been acquired for the one of the target components, and the display processing unit displays a plurality of pieces of the confidence information for each of the peak or peaks detected in each of the plurality of chromatograms that have been acquired for the one of the target components.

* * * * *